(12) United States Patent
Bostick et al.

(10) Patent No.: US 10,022,915 B2
(45) Date of Patent: Jul. 17, 2018

(54) ESTABLISHING SURFACE PARAMETERS WHILE PRINTING A THREE-DIMENSIONAL OBJECT FROM A DIGITAL MODEL

(71) Applicant: International Business Machines Corporation, Armonk, NY (US)

(72) Inventors: James E. Bostick, Cedar Park, TX (US); John M. Ganci, Jr., Cary, NC (US); Sarbajit K. Rakshit, Kolkata (IN); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 532 days.

(21) Appl. No.: 14/658,335

(22) Filed: Mar. 16, 2015

(65) Prior Publication Data
US 2016/0271881 A1    Sep. 22, 2016

(51) Int. Cl.
| | |
|---|---|
| *B29C 67/00* | (2017.01) |
| *G05B 15/02* | (2006.01) |
| *B29C 70/70* | (2006.01) |
| *B33Y 50/02* | (2015.01) |
| *B33Y 10/00* | (2015.01) |
| *B29L 31/00* | (2006.01) |

(52) U.S. Cl.
CPC .......... *B29C 67/0088* (2013.01); *B29C 70/70* (2013.01); *G05B 15/02* (2013.01); *B29L 2031/772* (2013.01); *B33Y 10/00* (2014.12); *B33Y 50/02* (2014.12)

(58) Field of Classification Search
CPC ................................ G05B 15/02; B29C 67/00
See application file for complete search history.

(56) References Cited

U.S. PATENT DOCUMENTS

| | | | |
|---|---|---|---|
| 2010/0315419 A1 | 12/2010 | Baker | |
| 2011/0121476 A1* | 5/2011 | Batchelder | B65H 49/322 264/40.1 |
| 2012/0223907 A1 | 9/2012 | Ryu et al. | |
| 2013/0079693 A1* | 3/2013 | Ranky | H01L 41/314 602/28 |

(Continued)

FOREIGN PATENT DOCUMENTS

WO    2013010910 A1    1/2013

OTHER PUBLICATIONS

Kading, Benjamin, et al., "Utilizing in-situ resources and 3D printing structures for a manned Mars mission". Acta Astronautica, 107 (2015) 317-326.*

(Continued)

*Primary Examiner* — Bret P Chen
(74) *Attorney, Agent, or Firm* — Stephen R. Yoder

(57) ABSTRACT

A process for applying surface parameter(s) to a three-dimensional (3D) printer object while the 3D printer object is being printed from a digital model. The surface parameter(s) includes a surface texture of a reference surface. The reference surface is scanned by a sensor to detect the surface parameter(s). The detected surface parameter(s) are received by the 3D printer for application to the 3D printer object. The surface texture is applied by a 3D printer to the 3D printer object while printing the 3D printer object based on the 3D digital model.

7 Claims, 3 Drawing Sheets

(56) References Cited

U.S. PATENT DOCUMENTS

| | | | |
|---|---|---|---|
| 2013/0105447 A1* | 5/2013 | Haake | B23K 26/345 219/76.14 |
| 2014/0277740 A1* | 9/2014 | Adelman | B25J 1/02 700/260 |
| 2014/0374935 A1* | 12/2014 | Flitsch | B29C 67/0088 264/40.1 |

OTHER PUBLICATIONS

Muth, Joseph T., et al., "Embedded 3D Printing of Strain Sensors within Highly Stretchable Elastomers". Advanced Materials, 2014, 26, 6307-6312.*

Leigh, Simon J., et al., "A Simple, Low-Cost Conductive Composite Material for 3D Printing of Electronic Sensors". PLoS One 7(11) : e49365, Nov. 21, 2012, pp. 1-6.*

Ahissar et al., "D1: Active sensing of textures in vision and touch—Implications on sensory substitutions for the blind and deaf", Bernstein Center Freiburg, University of Freiburg, Federal Ministry of Education and Research, included in Post Disclosure dated Aug. 21, 2014, <http://www.bcf.uni-freiburg.de/associated/research/d1>.

Bond, Steve, "Add texture to a 3d model for 3d printing using 3d coat", YouTube, Published on Dec. 6, 2012, <https://www.youtube.com/watch?v=3PIOUQt5W7c>.

Kimoto et al., "A new touch sensor for material discrimination and detection of thickness and hardness", Sensors and Actuators A: Physical, vol. 141, Issue 2, Feb. 15, 2008, pp. 238-244, doi: 10.1016/j.sna.2007.08.024, Copyright © 2007 Elsevier B.V., <http://www.sciencedirect.com/science/article/pii/S0924424707006401>.

LGM, "Exporting a model with Color and/or Texture Maps", Tuesday, May 20th, © 2014 lgm Models, <http://www.lgm3d.com/blog/exporting-a-model-with-color-and-or-texture-maps>.

Li et al., "Sensing and Recognizing Surface Textures Using a GelSight Sensor", 2013 IEEE Conference on Computer Vision and Pattern Recognition, © 2013 IEEE, DOI 10.1109/CVPR.2013.164, pp. 1241-1247.

Quick, Darren, "Tactile robot finger outperforms humans in identifying textures", Jun. 18, 2012, © Gizmag 2003-2014, <http://www.gizmag.com/biotac-tactile-robot-finger/23002/>.

Sachs et al., "Surface Texture by 3D Printing", Massachusetts Institute of Technology, Cambridge, MA, included in Post Disclosure dated Aug. 21, 2014, pp. 56-64.

Zahouani et al., "Effect of roughness on vibration of human finger during a friction test", Copyright © 2012 Elsevier B.V.. doi:10.1016/j.wear.2012.11.028, <http://www.sciencedirect.com/science/article/pii/S0043164812003705>.

"3D printing", Wikipedia, the free encyclopedia, page last modified on Dec. 4, 2014, <http://en.wikipedia.org/wiki/3D_printing>.

"Can I get detailed textures on my prototype parts?", PROTO3000, Frequently Asked Questions, © Copyright 2013 Proto3000 Inc., included in Post Disclosure dated Aug. 21, 2014, <http://proto3000.com/faqs.php?module[2]=record:18,display:13,cache:36,page:1>.

"Hardness Testing", Metallurgical Engineering Services, provided by inventors on Feb. 7, 2015, Copyright © 2006 Metallurgical Engineering Services, <http://www.metengr.com/Hardness.htm>.

"Stamping hardness detection methods", metal-stamping.com.cn, provided by inventors on Feb. 7, 2015, <http://www.highstamping.com/product-tendency/4.html>.

"Surface texture for 3D printed objects", Autodesk Community, Mar. 14, 2014, © Copyright 2014 Autodesk Inc., <http://forums.autodesk.com/t5/sketching-sculpting-modeling-and/surface-texture-for-3d-printed-objects/td-p/4887974>.

* cited by examiner

ESTABLISHING SURFACE PARAMETERS WHILE PRINTING A THREE-DIMENSIONAL OBJECT FROM A DIGITAL MODEL

BACKGROUND

The present invention relates generally to the field of three-dimensional (3D) printing, and more particularly to applying surface parameters to a printed 3D object.

3D printing technology is known. 3D printing, or additive manufacturing, is a process of making a three-dimensional solid object of virtually any shape from a digital model. 3D printing is achieved using an additive process, where successive layers of material are laid down in different shapes.

Sensors are known that can track finger movement including vibrations and/or waves to determine the texture of a physical surface. For example, the article "Effect of roughness on vibration on human finger during a friction test" written by H. Zahouani, et al. uses state of the art sensors in a "touch test." As described in this article, in order "to study the effect of a rough texture on tactile perception, the human finger was equipped with a sensor very sensitive to the vibration generated during a touch test. The range of vibrational frequencies is well consistent with the frequency of Pacini." Further, the article recites, "to analyze the vibrational characteristics of the human finger under different experimental conditions, our experimental results are based on two quantitative parameters: a parameter which measures the amplitude of the average vibration level Lv (dB), and a parameter related to the spatial resolution of the human finger and which is identified as the characteristic wavelength corresponding to the maximum of the power spectral density (PSD) in the Pacinian frequency band (1-500 Hz)."

Again, according to the above-mentioned article, "for a constant normal force, the parameter Lv (dB) allowed us to compare the received vibration with the finger as a function of the nature of the surface scanned, the scanning speed, the amplitude and wavelength of roughness. Depending on the scan rate used, it was possible to identify the wavelength filter of the human finger, which can be defined as the ratio of the scanning speed to the frequency corresponding to the maximum PSD: $\lambda f(mm)=v/\omega$. This result allowed us to set a lower speed 10 mm/s for better spatial resolution that can be achieved in the case of abrasive paper: 0.2 mm. To understand the role of texture morphology on finger deformation and vibration, a 3D contact model has been developed. Assuming the finger elastic deformation, the results of the contact model show the way the roughness is printed on the human fingerprint and the effect it produces on the contact pressure and give Von Mises stress for various textures."

It is known to detect hardness using a hardness tester. These hardness testers apply selected rulers, including one of the following rulers: (i) HRB; (ii) HRC; (iii) HRN; and (iv) HRT. The ruler is generally selected according to the type of material being tested. Conventional hardness tests include Rockwell superficial, Knoop/Vickers micro hardness, Durometer tests, and Brinell tests. (Note: the term(s) "Rockwell," "Knoop," "Vickers," "Durometer," and/or "Brinell" may be subject to trademark rights in various jurisdictions throughout the world and are used here only in reference to the products or services properly denominated by the marks to the extent that such trademark rights may exist.)

It is also known to use a touch sensor to simultaneously measure ultrasonic and electrical properties of objects by a sensor using a pair of piezoelectric ceramic transducers.

There are no runtime surface parameter changing options available in a three-dimensional (3D) printing process, particularly where the surface parameters are taken from a physical object.

SUMMARY

In a first aspect of the present invention, a method, a computer program product, and a system for applying a surface parameter to a three-dimensional (3D) printer object includes: (i) receiving a 3D digital model; (ii) detecting, by a sensor, a surface parameter of a surface of a physical reference model; (iii) receiving, by a 3D printer, the detected surface parameter; and (iv) applying, by the 3D printer, the detected surface parameter to a printer object. The 3D printer receives the detected surface parameter while printing the printer object. In that way, one aspect of the present invention allows for real time, surface parameter changes during 3D printing, from a physical object.

In a second aspect of the present invention, a method, a computer program product, and a system for applying a surface parameter to a three-dimensional (3D) printer object includes: (i) receiving a 3D digital model; (ii) detecting, by a sensor, a surface parameter of a surface of a physical reference model; (iii) receiving, by a 3D printer, the detected surface parameter; (iv) selecting a surface portion of the 3D digital model; and (v) applying, by the 3D printer, the detected surface parameter to a surface portion of the printer object corresponding to the selected surface portion of the 3D digital model. In that way, a detected set of surface parameters are applied to by the 3D printer to a 3D printer object having the detected set of surface parameters on a selected area of the printer object.

DETAILED DESCRIPTION

Figure 1:
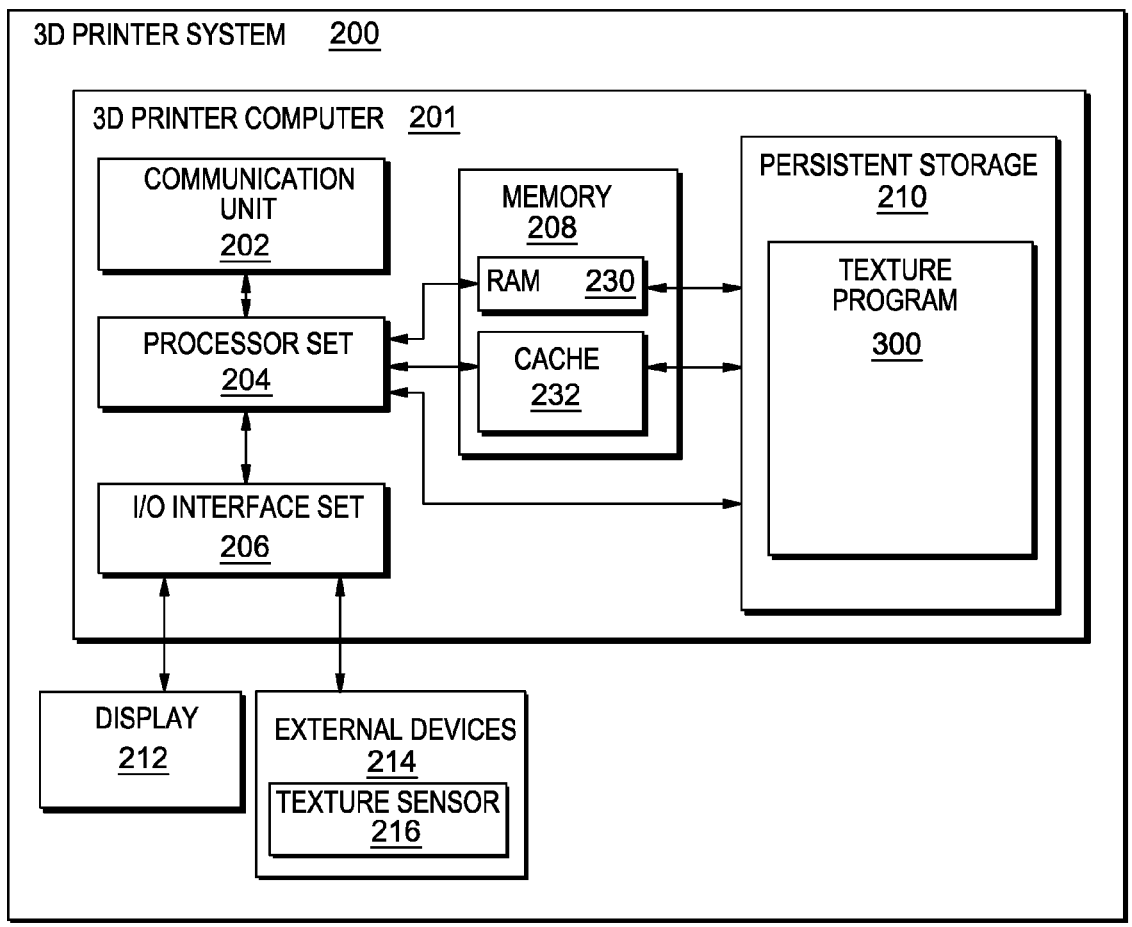
FIG. 1 is a schematic view of a first embodiment of a system, according to the present invention.

A three-dimensional (3D) printer object is produced to include a surface texture of a reference surface. The reference surface is scanned by a sensor to convey the surface parameter(s) to be applied to the 3D printer object. The surface texture is applied by a 3D printer to the printer object during printing to change a surface of the 3D digital model. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

The present invention will now be described in detail with reference to the Figures. FIG. 1 is a functional block diagram illustrating various portions of three-dimensional (3D) printer system 200, in accordance with one embodiment of the present invention, including: 3D printer computer 201; communication unit 202; processor set 204; input/output (I/O) interface set 206; memory device 208; persistent storage device 210; display device 212; external device set 214; texture sensor 216; random access memory (RAM) devices 230; cache memory device 232; and texture program 300.

3D printer system 200 will now be discussed in the following paragraphs.

Printer system 200 may be a dedicated printer system, but may also be a laptop computer, a tablet computer, netbook computer, personal computer (PC), a desktop computer, a personal digital assistant (PDA), a smart phone, so long as the programmable electronic device is capable of producing a 3D physical model from a 3D digital model. Texture program 300 is a collection of machine readable instructions and/or data that is used to create, manage, and control certain software functions that will be discussed in detail below.

Printer system 200 is shown as a block diagram with many double arrows. These double arrows (no separate reference numerals) represent a communications fabric, which provides communications between various components of printer system 200. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for printer system 200; and/or (ii) devices external to printer system 200 may be able to provide memory for printer system 200.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data) on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to printer system 200. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 201. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments, the relevant software may (or may not) be loaded, in whole or in part, onto persistent storage device 210 via I/O interface set 206. I/O interface set 206 also connects in data communication with display device 212.

Texture sensor 216 may be a vibration sensor capable of detecting a range of vibrational frequencies, such as the Pacinian frequency band, 1-500 Hz. Alternatively, texture sensor 216 may be an optic sensor, an optical scanner, and/or an ultrasonic sensor.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus, the present invention should not be limited to use solely in any specific application identified and/or implied by such nomenclature.

Program 300 operates to provide a user with an interface for customizing the surface parameters (including texture, roughness, glossiness, and/or softness) in a three-dimensional (3D) printing process at runtime by applying state of the art sensor sensitivity to the field of 3D printing. The 3D printer, when operating according to an embodiment of the present invention, creates a 3D physical object including surface texture details from a 3D digital model. Throughout this disclosure, the term "surface parameter" refers to parameters including: (i) surface roughness; (ii) cavities in the surface; (iii) surface smoothness; (iv) slickness (for example, the amount of friction in movement over a reference material, such as stainless steel, plastic, and graphite); (v) color; and (vi) relative hardness and/or softness (such as comparison to steel, wood, plastic, and foam.

Some embodiments of the present invention address the issue that there are no runtime surface parameter changing options available in a three-dimensional (3D) printing process, particularly where the surface parameters are taken from a physical object.

The following example is provided as a conceptual summary of the features and operation of some embodiments of the present invention. In this example, a 3D printer operator, Able, is preparing to kick off a job to print a 3D replica of an ink pen housing using the 3D printer. The ink pen housing, in this example, should have a rough surface where the fingers grip the housing. For the first step in this example, Able brings up a digital rendering, or digital model, of the pen housing, created in one of various conventional computer aided design (CAD) applications, for reference during the printing process. Able uses a ring-shaped sensing device to detect the surface parameters of a physical reference object having the desired texture for the finger grip area. In this example, the sensing device is proximate to, and in electrical communication with, the 3D printer. Alternatively, the sensing device transmits a signal to a remote location where the 3D printer is operating. The sensing device includes a conventional sensor, such as described in the Background Section of this specification. In that way, the ring-shaped device has a set of sensors that, when worn on a finger, track that finger's movement, vibrations, and so forth as Able runs that finger over the surface of the reference object. As the ring-shaped device detects the surface parameters, Able selectively applies the detected parameters to the portion of the digital model where the finger grip is to be applied. Alternatively, the surface properties are stored in memory, whether locally or in remote storage, for use during the print job.

Able may repeat this process for various sections of the digital rendering to generate different surface textures on the same 3D object. When the surface parameters are stored in memory, Able may re-select the stored surface parameters for use on another 3D printed object, according to his desire. The printing system associated with the 3D printer creates a 3D physical object from the 3D digital rendering application, in addition to applying the input surface parameters on the selected section(s). Printing of the 3D object is based on the resultant 3D digital image created from the steps in the above example. The resulting 3D object is produced having a surface area that includes the surface parameters that Able input via the ring-shaped sensing device.

Figure 2:
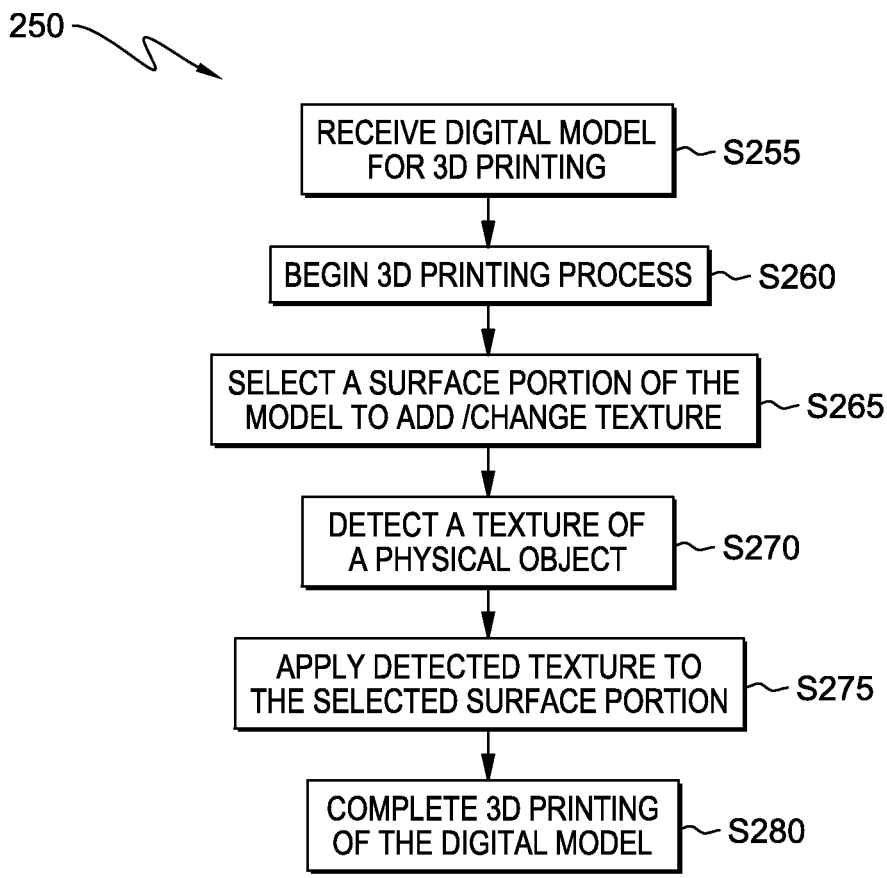
FIG. 2 is a flowchart showing a first method performed, at least in part, by the first embodiment system.
Figure 3:
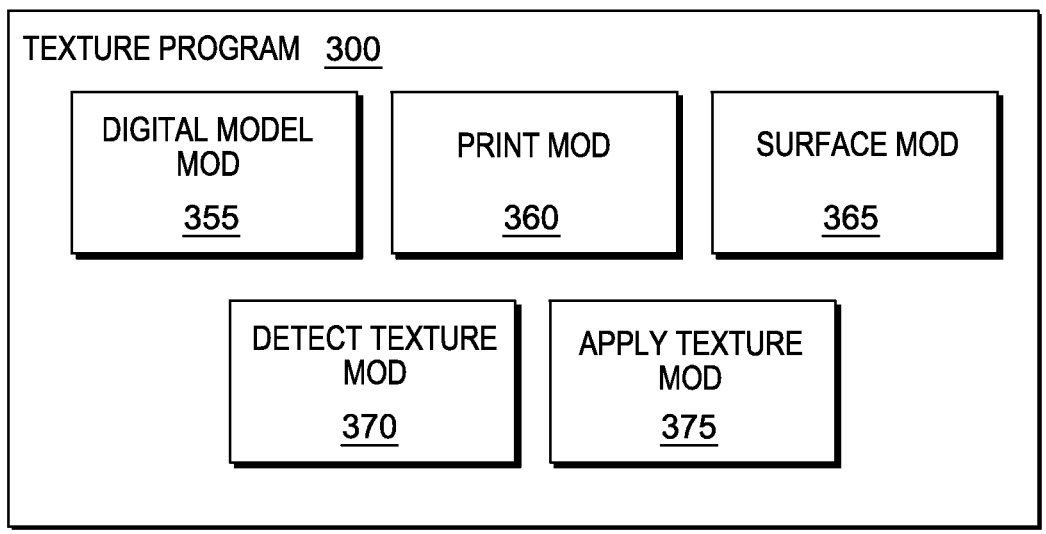
FIG. 3 is a schematic view of a machine logic (for example, software) portion of the first embodiment system.

FIG. 2 shows flowchart 250 depicting a method according to the present invention. FIG. 3 shows texture program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where digital model module ("mod") 355 receives a 3D digital model for three-dimensional (3D) printing. The digital model in the example above is created beforehand by a conventional CAD system. Alternatively, the digital model is created by the same 3D printer computer using conventional software stored in the persistent memory.

Processing proceeds to step S260, where print mod 360 begins the 3D printing process. Continuing with the above example, only a portion of the pen housing will receive the finger grip surface. Accordingly, the printing process begins, but does not require the surface parameters of the physical reference object.

Processing proceeds to step S265, where surface mod 365 selects a surface portion of the model to add or change the surface parameters. In the example, during the printing process, Able selects the portion of the pen housing where the finger grip is to be applied. Alternatively, this step is performed before the printing process begins. This alternative procedure may apply well to cases where the entire surface is to receive a particular surface texture, or where the first portion of the printed model is the portion on which a surface texture is applied.

Processing proceeds to step S270, where detect texture mod 370 detects a texture of a physical object. In this example, the surface parameters for the finger grip are on a physical reference object. Alternatively, the 3D print object is a duplicate of the reference object bearing the target surface parameters, and the surface parameters for the 3D print object are detected by the sensor for the surface portion corresponding to the surface portion being printed during runtime.

Processing proceeds to step S275, where apply texture mod 375 applies the detected texture, or surface parameter(s), to the selected surface portion. During the printing process, as a selected surface portion is being printed, the detected texture is applied to the 3D print object. In the example, when the finger grip portion of the pen housing is being printed, the corresponding texture detected in step S270 is applied to that portion. Additionally, where there are multiple surfaces to be textured, as each portion is printed, the corresponding texture is applied. In some embodiments, the texture for a given portion is detected in real time or, simply, during runtime, as the portion is printed.

Processing proceeds to step S280, where print mod 360 completes the 3D printing process to produce a 3D printed object based on: (i) a 3D digital object; and (ii) a physical reference object. In the example, the pen housing that Able is printing will complete, and a 3D print object will reflect both the CAD image and the surface texture applied to the finger grip portion.

Figure 4:
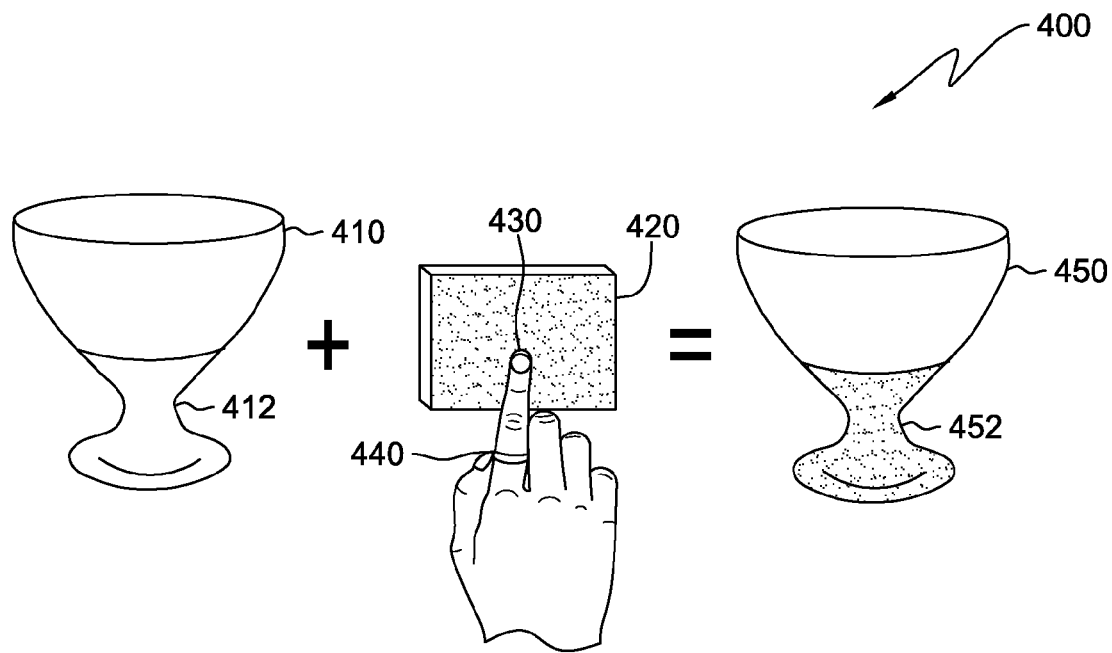
FIG. 4 is a diagram showing a second method, performed according to an embodiment of the present invention.

FIG. 4 illustrates example process 400, where ring-type sensor device 440 is used to detect the surface parameter(s) of reference object 420. In this example, cup 410 is a 3D digital model used as the base structure. Physical reference object 420 is touched by finger 430, which is wearing ring-type sensor 440, to sense the surface parameters based on the physical contact of the finger with the reference object. The user-selected region for applying the sensed surface parameters is digital texture region 412. The output is physical object 450 having the geometry of the cup and the surface texture of the reference object applied at physical texture region 452. In this example, the surface parameter sensor device is a ring worn on the finger of a user. Alternatively, a thimble worn on the fingertip is the surface parameter sensor device (discussed below with respect to FIG. 5). Alternatively, a stylus-type device is the surface parameter sensor device (not shown).

Some embodiments of the present invention provide for 3D printing where the base structure of the physical model being printed is based on a digital 3D object, such as one drawn from an AutoCAD system. The surface parameters of the 3D printed object are copied and replicated from the surface parameters of physical objects during run time. The term "surface parameter" is used herein to mean any one or more of surface roughness, cavities in the surface, and/or surface texture. This is done by "reading" the source surface area with sensors capable of understanding the intricacies of the surface. These surface area properties may be replicated throughout a selected printing section of the 3D print object. Selection may be made, for example, by the printer operator. Multiple surface area types may be applied to a single 3D print job during runtime.

Some embodiments of the present invention are directed to providing a 3D printer with the capability to detect and/or read a surface texture, or other surface parameter, from a physical object during 3D print runtime for applying the input surface texture to the 3D print rendering (or selected portions of the print rendering).

Some embodiments of the present invention are directed to integration of real-time surface parameter capture with other 3D fields, such as video games or other modeling solutions. Further, some embodiments of the present invention are directed to technical fields including: (i) augmented reality; (ii) virtual reality; and/or (iii) 3D applications such as printing, rendering, and modeling.

According to some embodiments of the present invention, a surface parameter is gathered from a sensor that detects the surface properties of a physical object. In this example, the 3D printer operator defines the area range, or surface area, in the 3D model where the surface properties are to be applied. The operator selects multiple surface parameters for different portions of the 3D model. The operator employs a set of sensor(s) according to one or more of the sensors described in the background, or otherwise known in the art, by using a ring that includes the set of sensor(s) as shown in FIG. 4. During operation, in this example, the operator moves the ring, or simply the finger bearing the ring, over the physical object so that the sensor(s) can read the surface parameter(s) of the physical object and determine the surface property(ies). The 3D printer reads the digital 3D object and the surface parameter values input from the sensor to print a 3D object from the given input source (such as AutoCAD) having the input surface property(ies) on the specified portions of the 3D digital model. (Note: the term(s) "AutoCAD" may be subject to trademark rights in various jurisdictions throughout the world and are used here only in reference to the products or services properly denominated by the marks to the extent that such trademark rights may exist.) Alternative embodiments may include a sensor attached to the tip of the operator's finger instead of the ring. Alternative embodiments receive surface parameter data, as described above, in order to store the parameter data in memory and subsequently apply user-selected parameters to user-selected portions of the 3D objects during the 3D printing operation.

Where the surface parameter(s) are stored as image metadata in memory, such as "roughness metadata." While printing a 3D object, the user selects an appropriate portion of the digital 3D object and selects the image having the roughness metadata from a computing system. The software locates the roughness metadata from the selected image and changes the surface parameter(s) of the object being printed during the 3D printing operation on a run time basis.

Some embodiments of the present invention employ devices other than a ring to read and/or determine the surface parameters depending on the implementation environment in which the invention is used. Devices that may include a set of sensor(s) similar to the ring described above include: (i) a glove; (ii) a scanning device, such as a robotic arm; and (iii) a touch-sensitive stylus. Technology other than the set of sensor(s) described above that may also serve to "read" the surface parameters includes: (i) optic devices and an impression mold; (ii) a optical scanner; and (iii) sound waves may be applied to generate a topography on smaller scale. In some embodiments of the present invention, the sensor device is attached, via a wired connection, to the 3D printer.

According to some embodiments of the present invention, 3D printing is supported in such a way that a 3D base structure of a physical object is established by a digital 3D object file, such as one drawn from a computer aided design system. A set of surface parameters for the 3D base structure is copied, or replicated, from surface parameter input via physical contact with a rigid surface. The set of surface parameters is "read" with sensors capable of understanding the intricacies of a rigid surface. The surface parameter(s) are replicated throughout a selected section of the 3D base structure. In this example, the selected section is one deemed appropriate by the system operator. According to some embodiments of the present invention, various different surface area types, having different surface parameter(s), are applied to a single 3D base structure at selected sections of the structure. Some embodiments of the present invention read and determine alternative surface attributes, such as softness, hardness, and/or slipperiness. For example, with a spongy object, a pressure sensor in a glove device is used for sensing the amount of depression for a given applied force. Additionally, where properties other than appearance are determined, a material is selected from among various materials having particular properties of interest, such as hardness, slipperiness, and so forth.

Some embodiments of the present invention are directed to a method and/or system for a user to customize the surface parameters (texture, roughness, etc.) of a 3D printed object during 3D object creation at runtime. The invention application solves runtime surface parameter changes in 3D printing from a physical object.

Some embodiments of the present invention take advantage of the sensitivity capability of known sensors, including: (i) sensors sensitive to the vibration of a finger touching a textured surface; and/or (ii) sensors sensitive to vibrations within the Pacinian frequency band (1-500 Hz). The 3D printer replicates the surface texture and/or other surface properties of the physical object from the digital 3D model.

Some embodiments of the present invention require a 3D printer that is capable of using multiple compounds for surface texture(s) while printing a 3D object. Further, some embodiments make use of the colors of various compounds so that the surface parameters are mapped to the printed object, for example, silver for a smooth surface and gold for a grainy surface.

Figure 5:
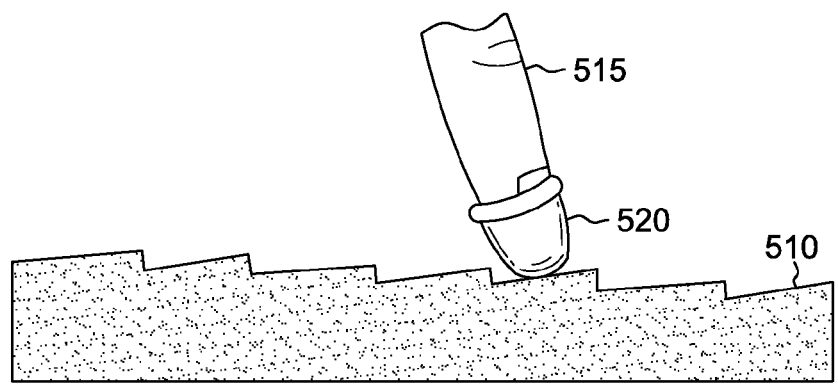
FIG. 5 is a diagram showing a third method, performed according to an embodiment of the present invention.

FIG. 5 shows thimble-type sensor device 520 worn on finger 515. The thimble-type sensor device detects the surface parameter(s) of textures surface 510. Alternative embodiments include a sensor installed on the fingernail of the user. The fingernail sensor has a similar function as the thimble-type device in that the user moves the finger over a target surface where the sensor "reads" the surface roughness, or other surface parameter, based on finger movement. By selecting any surface portion of digital image during the 3D printing process, the user applies a surface parameter corresponding to the surface on which the user moves the fingernail over. The software, in this example, understands the surface parameter based on the movement of the fingernail so that the 3D printer prints that same surface parameter being touched by a user's finger. Alternatively, the user touches a stylus to the physical object to convey a surface parameter to the 3D printer during runtime.

Some embodiments of the present invention are directed to a 3D camera that reads the surface of a painting and captures the image. The captured images are sent to a computing system for image analysis where the image analysis data is sent to the 3D printer application for printing the surface parameters on the 3D object being printed.

Some embodiments of the present invention include a "sample mode," where the 3D printer creates samples of a textured surface as a tab attached to the 3D object. In this example, an attached tab is a planar object that is large enough for a user's finger to touch and recognize the printed texture. An exemplary process where the sample mode is used is where the user interacts with the attached tab and indicates, at runtime, whether or not the printed texture is acceptable. If the printed texture is acceptable, the attached tab is detached from the printed object, and the 3D print is then completed with the sampled texture.

Another exemplary process for use with a sample mode follows. As described herein, a surface parameter is "read" into the 3D print application, or otherwise stored for use by a 3D print application, via a set of sensor(s). There is a configurable switch that allows for the sample mode instead of directly printing the surface texture on the object being printed. In this example, sample mode is configurable because, when the confidence level is acceptable, the user takes the printer out of sample mode and prints the 3D print object without having to take the time to produce an entire sample 3D object. In this example, the 3D printer is preprogrammed (when running in sample mode) to print a sample tab of a specified size for evaluation. In that way, the user determines if the printed surface parameter(s) are correct, or acceptable, and makes a real-time decision to "continue" printing the 3D object, or portion thereof. Where the sample is not satisfactory, the user selects "adjust," and inputs parameter adjustment(s) on a computer screen. Parameter adjustments that are manually input may be simple adjustments including: (i) making the surface 10 percent rougher; and/or (ii) making the surface 5 percent glossier. Alternatively, the user re-scans the physical object to make an additional attempt at "reading" the surface parameter(s). In this example, after an adjustment is input, the user receives another sample tab for the user to evaluate prior to continuing the 3D print job.

Some embodiments of the present invention may include one, or more, of the following features, characteristics and/or advantages: (i) allows for real time, surface parameter changes during 3D printing, from a physical object; (ii) applies to video games or other 3D modeling applications; (iii) provides for surface rendering where applications require that true-to-life models; (iv) supports augmented reality, virtual reality, 3D printing, 3D rendering, and/or 3D modeling; (v) allows for automatic rendering of surface areas detected by a 3D printer operator; (vi) applies a detected set of surface parameters to 3D rendering, such that a 3D printer produces a 3D printed object having the detected set of surface parameters on a selected area of the object; (vii) allows a user to select a physical object and touch the objects surface to "read" the surface, that is, input a set of surface parameters associated with the surface of the object, using technology that is then received and stored in a 3D printing application for use in printing a rendering of a 3D object; (viii) applies a set of surface parameters to a digital file of a 3D object at a specified area, whether the entire surface or a portion of the surface; (ix) store surface parameter sets for use in future print applications; (x) allows a 3D printer operator to handle a physical object and touch its surface to "read" the surface properties using sensor technology, the surface properties being transmitted and stored in a 3D printer application for usage; (xi) sample mode allows the user to sample the texture before proceeding with the expensive print; and/or (xii) sample mode provides for the user to correctly print a 3D print object without having to take the time to produce an entire sample 3D object, but prints initial sample "tabs" for pre-print evaluation, or at least evaluation, before printing a particular textured surface of the 3D object.

SOME HELPFUL DEFINITIONS FOLLOW

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Real time: includes any time frame of sufficiently short duration as to provide reasonable response time for information processing acceptable to a user of the subject matter described; in other words, any latencies are sufficiently short in duration such that a user would react substantially the same way as if there was no latency between a change, or event, and the presentation of the change, or event, to the user.

What is claimed is:

1. A method for applying a surface parameter to a three-dimensional (3D) printer object, the method comprising:
   receiving a 3D digital model of a first object;
   causing a 3D printer to initiate building a 3D printer object representing the first object based on the 3D digital model;
   detecting, by a sensor, while the 3D printer builds the 3D printer object, a surface parameter of a reference surface of a second object;
   receiving the surface parameter of the reference surface;
   causing the 3D printer to build the 3D printer object based on the 3D digital model and the surface parameter;
   applying, by the 3D printer, the surface parameter to the 3D printer object while building the 3D printer object;
   wherein:
   the first object is different than the second object.

2. The method of claim 1, further comprising:
   selecting a surface portion of the 3D digital model;
   wherein the applying, by the 3D printer, the surface parameter to the 3D printer object operates to apply the surface parameter to a corresponding surface portion of the 3D printer object.

3. The method of claim 1, wherein the sensor is a vibration sensor.

4. The method of claim 1, wherein the applying step occurs during runtime as the 3D printer object is printed.

5. The method of claim 1, wherein:
   the sensor is embedded in a device that is adjacent a finger of a user; and
   the surface parameter is detected while the finger is in contact with and moves along the surface of the second object.

6. The method of claim 1, wherein:
   the sensor is embedded in a device that is adjacent a finger of a user; and
   the surface parameter is detected with the finger causing the device to contact and move along the surface of the second object.

7. The method of claim 1, wherein:
   the sensor is embedded into a stylus device; and
   the surface parameter is detected by the stylus device contacting the surface of the second object.

* * * * *